May 9, 1939.  L. E. GODFRIAUX  2,157,892
TRANSMISSION AND CONTROL
Filed March 12, 1937  3 Sheets-Sheet 1

INVENTOR
LOUIS E. GODFRIAUX
BY
ATTORNEY

INVENTOR
LOUIS E. GODFRIAUX
BY
Fred G. Parsons
ATTORNEY

May 9, 1939.  L. E. GODFRIAUX  2,157,892
TRANSMISSION AND CONTROL
Filed March 12, 1937   3 Sheets-Sheet 3

INVENTOR
LOUIS E. GODFRIAUX
BY
*Fred A. Parsons*
ATTORNEY

Patented May 9, 1939

2,157,892

UNITED STATES PATENT OFFICE 2,157,892

TRANSMISSION AND CONTROL

Louis Edward Godfriaux, Madison, Wis., assignor to Gisholt Machine Company, Madison, Wis., a corporation of Wisconsin Application March 12, 1937, Serial No. 130,524

10 Claims. (Cl. 82—28)

This invention relates to machine tools, and more particularly to machines having power operable work or tool holding devices, such as lathes having power operable chucks.

A purpose of the invention is to provide improved transmission and control mechanism for the power operation of work or tool holding devices, such as chucks, carried on rotating spindles, and an improved combination and relationship of the transmission and control mechanism of the machine and the transmission and control mechanism of the device.

A further purpose is to provide an improved hydraulic transmission, and control mechanism therefor, particularly suited for use with chucks, such for instance as those shown in the co-pending applications, Serial No. 58,268, filed January 9, 1936 and No. 59,335, filed January 16, 1936.

Other purposes are to provide a machine tool having an improved means for carrying the power for operation of a rotatable device, such as a chuck, from a relatively stationary power source, and improved means for controlling the power for operation of the device, and particularly where the device is hydraulically operated.

Another purpose is generally to simplify and improve the construction of machine tools, and particularly for the hydraulic operation of machine tool chucks, and still other purposes will be apparent from this specification.

The invention consists in the construction and relationship of parts as herein illustrated, described and claimed and in such modification of the structure illustrated and described as is equivalent to the structure claimed.

In the specification the same reference characters have been used to indicate the same parts throughout, and in the drawings.

Figure 1:
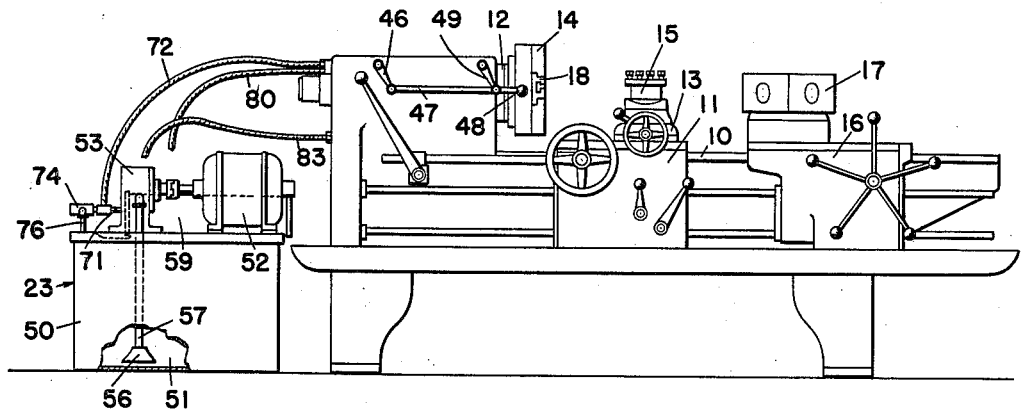
Figure 1 is a front elevation of a lathe in which the invention is incorporated.

The machine shown in Fig. 1 is a machine tool of the type commonly termed a turret lathe, having a bed or base 10, a tool carriage 11 slidably guided on bed 10 for movement in a direction parallel with the axis of a rotatable work spindle 12, a cross slide 13 slidably guided on carriage 11 for movement transverse to the spindle axis, a chuck 14 fixed on spindle 12, and a turret tool post 15 carried by the cross slide. The lathe also includes a turret carriage 16, slidably guided on the bed, and an indexible tool turret 17.

The chuck 14 may be of various forms but as here shown is of the particular form shown and described in said co-pending application Serial No. 58,286 and will not, therefore here be described in detail. It includes a body portion in which jaw carrying members such as 18 are guided for work clamping and releasing movement, there being fluid operable piston means, not here shown, within the chuck body and mechanically connected for such movement.

Fluid for operation of the jaw operating piston devices is carried to the chuck 14 through channels 19, 20 in the spindle 12, the channels 20 being respectively for opposite piston movement and each connected to channels connected to the pistons within the chuck, such as the channel 21 shown connected with channel 20, the connection being of a form connectible and disconnectible as the chuck is replaced on and removed from, the end of the spindle, as shown at 22.

The channels 19, 20 are supplied with fluid, preferably lubricating oil, from a transmission and control mechanism which in this instance includes a reservoir, pump and accumulator unit generally denoted by the numeral 23, Figs. 1, 2, which will be later described, and a coupling unit 24, Figs. 3, 4. The coupling unit 24 is intended to provide substantially leakless fluid transmission from the stationary position of the fluid transmission to the rotating spindle channels 19, 20, but in any event, the coupling being within the hollow headstock, any leakage will be retained within the fluid circulating system, as later described.

Figure 4:
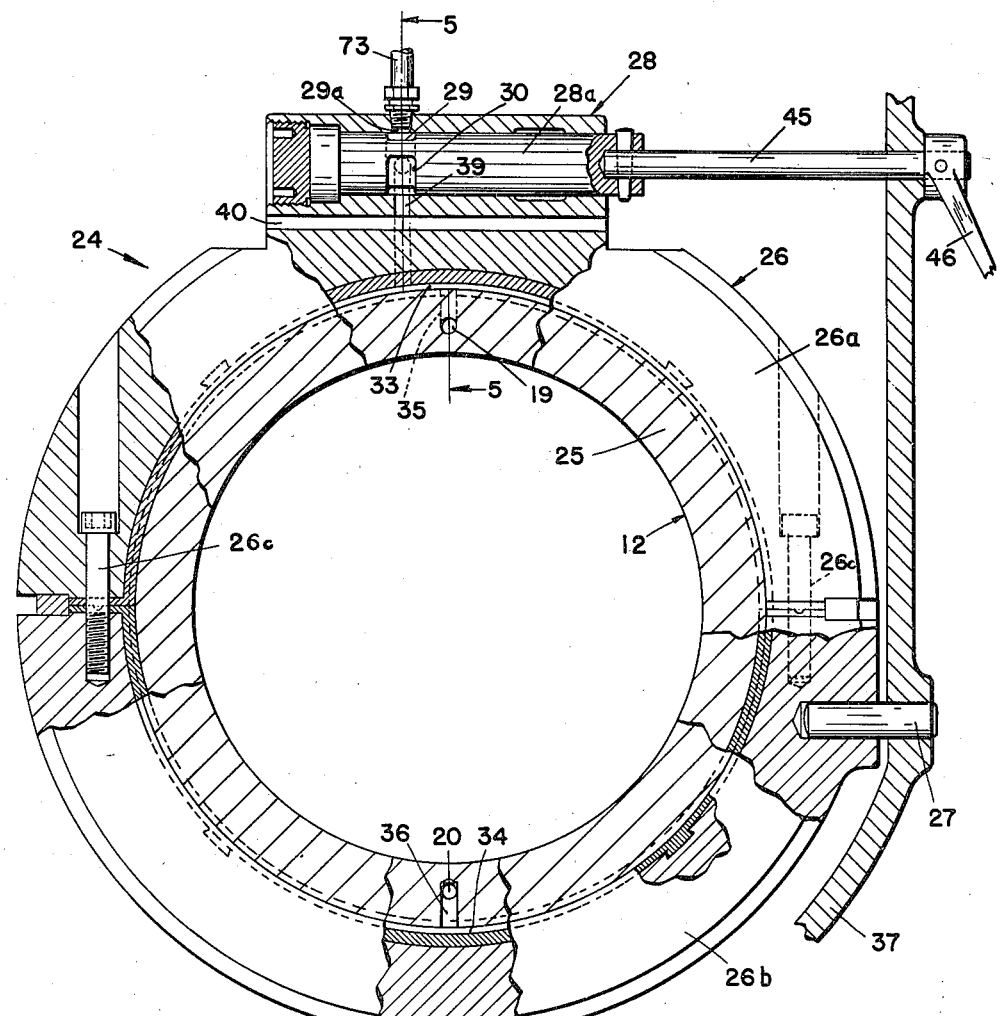
Figure 4 is an enlarged transverse partial section through a fluid channel coupling taken along line 4—4 of Fig. 3.

The coupling unit 24 includes an inner portion 25, integrally formed, in this instance, with the spindle 12, and an outer portion generally denoted by the numeral 26, forming a sleeve around the inner portion and prevented from rotating, as for instance by a stud 27, Fig. 4, the outer portion 26 comprising parts 26a, 26b separably fixed together, as by screws 26c to form a joint substantially in the plane of the spindle axis.

Figure 3:
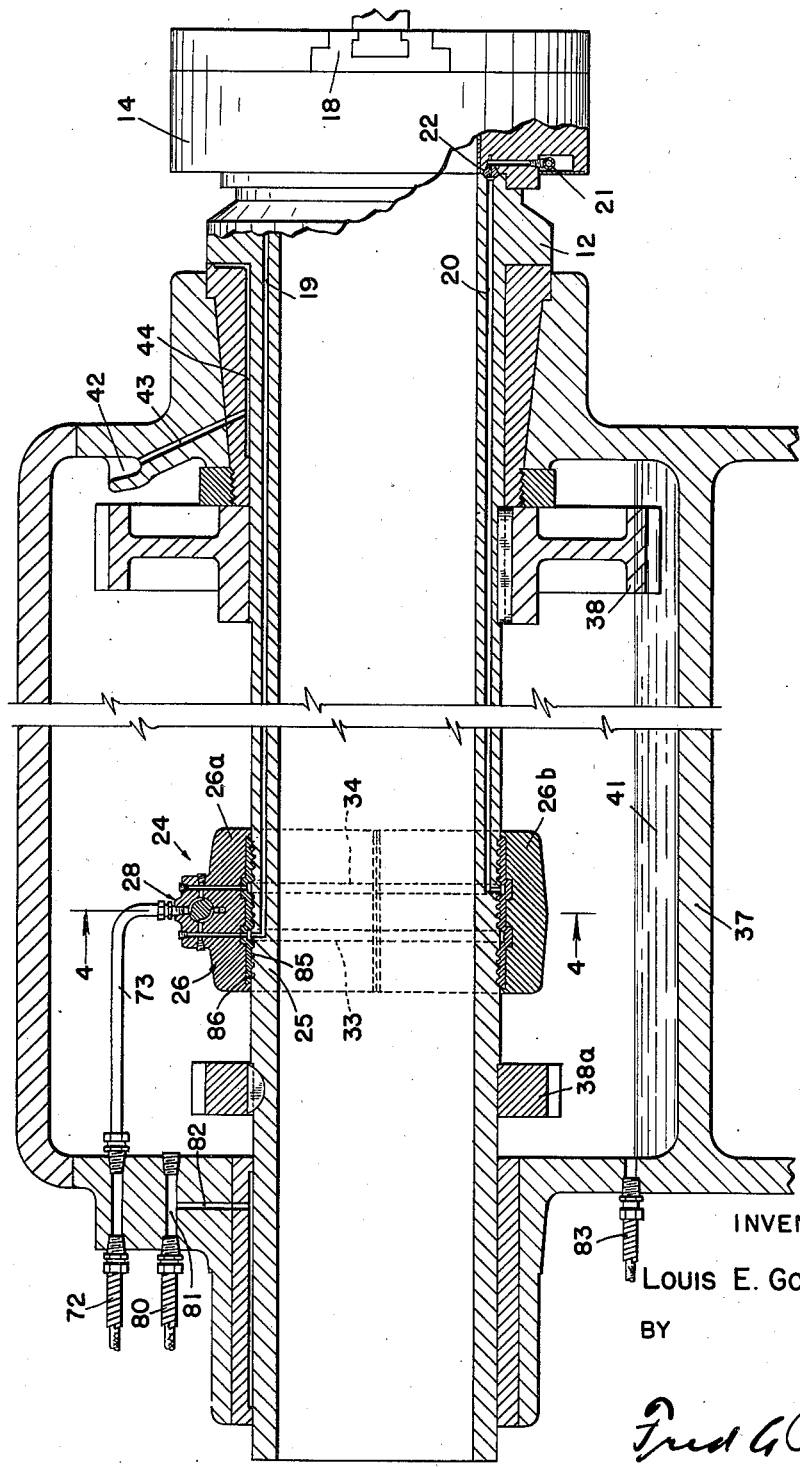
Figure 3 is an enlarged partial vertical section taken along the axis of the spindle of the lathe shown in Fig. 1.
Figure 5:
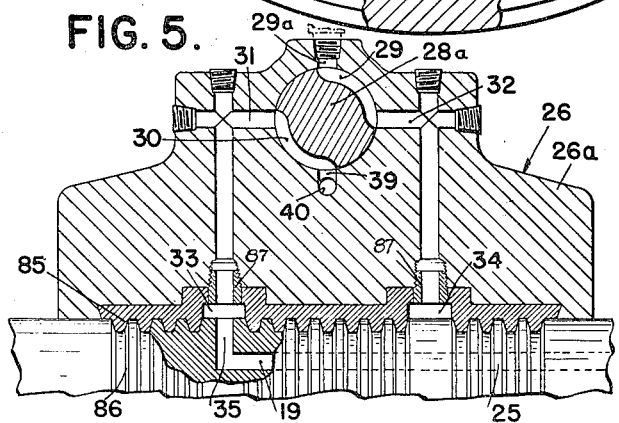
Figure 5 is a partial vertical section along lines 5—5 of Fig. 4.

The part 26a carries a pressure reversing control valve generally denoted by the numeral 28, Figs. 3, 4, which includes a rotatable valve member 28a, having portions cut away at 29, 30, Figs. 4, 5, to provide passages which in different positions of member 28a, respectively connect a pressure port 29a, Figs. 4, 5, with the one or the other of ports 31 or 32, respectively communicating with annular grooves 33, 34, Figs. 3, 4, 5, in the coupling portion 26, the grooves 33, 34 respectively communicating through drilled holes, 35, 36 with the channels 19, 20 in spindle 12.

At the same time that oscillation of valve member 28a effects communication of pressure port 29a with one of the spindle channels 19, 20, the other channel is connected to drain its fluid into the hollow headstock portion 37, which houses transmission gearing, some of which is shown fixed on the spindle at 38, 38a. The drain is effected by communication of the one or the other of the cut away portions 29, 30 of number 28a with a drain channel 39 and passageway 40, Figs. 4, 5, in the part 28a. Fluid thus delivered to the housing 37 collects in the lower portion, as at 41, to be picked up by some of the gearing such as the gear 38, whereby to be distributed to the various shafts and gears within the housing. Some of the fluid is thrown off from the gearing to fill the interior of the housing with fluid drops which may be collected by a pocket, such as 42 for lubrication of the bearings, as by channels 43, 44.

Valve member 28a may be oscillated, to change the pressure fluid connection whereby to effect alternative clamping and unclamping operation of chuck 14, by the means of a shaft 45, Fig. 4, a lever 46, Figs. 1, 4, and a rod 47 which is pivoted at the one end with lever 46, and extended to carry a manual hand grip portion 48, at a point adjacent the normal position of the operator of the machine, the front end of rod 47 being supported on a pivoted arm, 49.

The pressure fluid supply unit 23, includes a base 50, providing a reservoir 51, a power source such as a driving motor 52, and a pump generally denoted by the numeral 53. Pump 53 may be of any suitable well known form for positive fluid delivery, such as a gear type pump, and is therefore not shown in detail. Pump 53 includes a drive shaft 54, Fig. 2, driven from motor 52 through a coupling 55.

Figure 2:
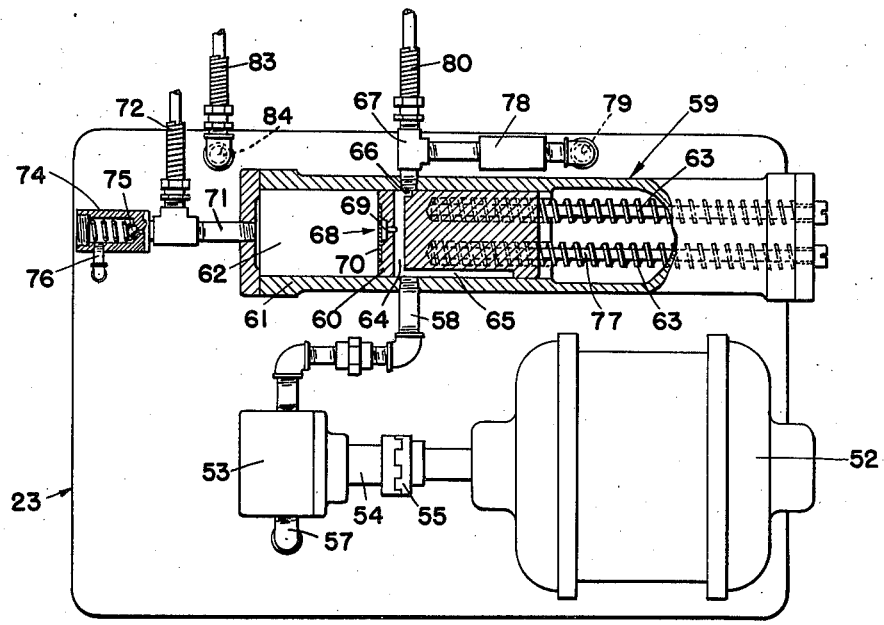
Figure 2 is a plan view, partly in horizontal section, of a pressure fluid supply unit shown at the lower left in Fig. 1.

Pump 53 draws liquid from reservoir 51, through a strainer 56 and a pipe channel 57, and delivers liquid through a pipe channel 58 to an accumulator device generally denoted by the numeral 59, Figs. 1, 2. The accumulator 59, includes a piston or plunger 60 operating in a cylinder 61, which at the one end provides an accumulator chamber 62, the piston 60 being continuously urged in the direction of chamber 62 by springs such as 63, 63.

Piston 60 provides a passage 64 opening at the one end into a groove 65, which communicates with pipe channel 58 in all positions of the piston, and opening at the other end into a short groove 66, which communicates with a pipe channel 67, but only after chamber 62 has been filled to its intended maximum capacity, as in the piston position shown in Fig. 2. At other times, when chamber 62 is partly or completely empty the piston 60 stands to the left of the Fig. 2 position and groove 66 is then closed against delivery to pipe channel 67, fluid from pump 53 then passing into the chamber 62 through a one-way valve device generally denoted by the numeral 68, which may be of any suitable form, but as here shown includes a valve member 69 normally closed by a flat spring 70, similarly to certain one-way valves in said co-pending application Serial No. 58,268.

Leading from chamber 62 of the accumulator is a pipe channel 71, Fig. 2, continuously connected with the supply port 29a of valve 28, as by a flexible tube 72, Figs. 1, 2, 3, and a pipe channel 73. An overload relief or by-pass valve 74, Figs. 1, 2, includes a spring pressed ball 75, and serves to return liquid from the chamber 62 to the reservoir 51 through a suitable channel such as 76, but only after the chamber 62 is filled with liquid, the spring pressure of the relief valve being sufficient to overcome the piston springs 63. Stop means for the right hand movement, Fig. 2 of the piston 60 may be provided, as for instance rod 77, which abuts the piston at the bottom of one of the bores which receive springs 63, 63.

The channel 67 which is supplied with fluid from pump 53, but only after chamber 62 is filled, as previously explained, is connected to return surplus fluid to reservoir 51 through a relatively low pressure relief valve 78 and a channel 79. The low pressure fluid may be used for various purposes, such as pressure lubrication, as for instance through a flexible tube 80, Figs. 1, 2, 3, and channels 81, 82, leading to a spindle bearing. Excess and waste fluid from the headstock reservoir 41, is returned to reservoir 51 through a flexible tube channel 83, Figs. 1, 2, 3, and a channel such as 84.

The coupling members 25 and 26, for the purpose of preventing leakage, are constructed with closely rotatably fitted annular groove and ring portions. As shown in Figs. 3, 5, grooves such as 85, 86, are similarly formed in each member and spaced for the portions intermediate the grooves of the one member to form rings fitting into the grooves of the other member, and the coupling members are constructed for a plurality of such fitted grooves and rings to oppose leakage between the annular channels 33, 34, and also from either annular channel outwardly along the joint between the coupling members. In the form shown in the drawings the ring portions project to closely fit the bottom of the grooves, but it is substantially as effective for the prevention of leakage to provide a slight clearance at the bottom of each groove, in which case, and particularly if the grooves are of angular sides, as shown, the parts 26a, 26b may be faced off along their abutting faces and drawn closer together to compensate for wear between the opposed angular side surfaces, thus maintaining any desired closeness of fit between the engaged groove and ring portions.

The angle employed on the sides of the grooves of the coupling members 25 and 26 is of importance in the prevention of leakage. A certain amount of radial clearance must be provided between the rotating members, amounting in some cases to several thousandths of an inch, if the spindle is of large diameter, but if the sides of the groove are angular, as shown, the axial clearance effective to prevent leakage may be only a fractional part of the radial clearance, because axial distortion is relatively much less than radial distortion.

A coupling such as 24 is substantially completely balanced against any side thrust caused by the oil pressure, and substantially completely prevents leakage of pressure fluid. Therefore, there is very little heating of the fluid from either of these causes. As a result of the relatively small amount of generated heat, the mechanism may be considerably simplified in many instances by eliminating the separate reservoir 51, since one of its principal purposes is to provide for cooling. In that case pump 53 may derive its fluid directly from the headstock reservoir 41, and may, if desired, be directly associated within the headstock, together with the accumulator 59.

For convenience of manufacture, the grooves may first be cut in the inner coupling member 25, and the complementary fitting of the rings of member 26 may then be effected by pouring, into a suitable recess in the outer member, a melted non-shrinking alloy which solidifies in close conformity to the grooved inner member, the inner member acting as a mandrel to form the grooves in the outer member. The drawings, Figs. 3, 4, 5 show a construction formed in the manner just described. When so formed it is necessary to prevent oil pressure acting between the outer wall of the alloy liner and the inner wall of the recess in the outer member. This is effectively accomplished by providing at each point where the oil is carried inwardly to the liner, nipples such as 87, Fig. 5. These nipples are preferably of brass or similar material which are tinned on their exterior before being screwed in place in the member 26a. During the casting of the alloy liner the alloy forms an integral joint with the tinned nipple.

What is claimed is:

1. In a pressure fluid coupling the combination of a rotatable part and a non-rotatable part, pressure fluid channels respectively in different of said parts, one of said parts providing a plurality of annular axially spaced co-axial grooves, said grooves having angularly disposed sides to effect a relatively narrow bottom groove portion, the other of said parts providing a plurality of ring portions closely rotatably fitted respectively between the sides of different of said grooves and conforming to the angle thereof, and a passageway connecting between said channels at a point axially between the end rings of said plurality of rings, said non-rotatable part comprising a plurality of portions separably joined along abutted surfaces substantially in a plane coinciding with the axis of said rotatable part.

2. In a machine tool the combination of a hollow housing, a rotatable spindle having a portion extended within said housing and an end exposed outside the housing, a bearing for said spindle carried by a wall of said housing and axially between said extended portion and exposed end, a fluid operable device carried by said exposed spindle end, a pressure fluid source, a pressure fluid coupling within said housing including a part carried by and rotatable with said spindle and a non-rotatable part, and channel means connecting said source for operation of said device including a passageway connecting between said rotatable and non-rotatable coupling parts and extended through said bearing.

3. In a machine tool the combination of a hollow housing, a rotatable spindle having a portion extended within said housing and an end exposed outside the housing, a bearing for said spindle carried by a wall of said housing and axially between said extended portion and exposed end, a fluid operable device carried by said exposed spindle end, a pressure fluid source, a fluid pressure coupling within said housing including a part carried by and rotatable with said spindle and a non-rotatable part, and channel means connecting said source for operation of said device including a passageway connecting between said rotatable and non-rotatable coupling parts and extended through said bearing, one of said coupling parts providing a plurality of annular axially spaced co-axial grooves, the other of said coupling parts providing a plurality of annular rings closely rotatably fitted respectively between the sides of different of said grooves, said passageway connecting between said parts at a point axially between the end rings of said plurality of rings.

4. In a machine tool the combination of a rotatable spindle, gearing on said spindle, a hollow housing enclosing said gearing, a spindle bearing carried by a wall of said housing, said spindle extending through said bearing and having an exposed end, a fluid operable device carried by said exposed spindle end for rotation with said spindle, a pressure fluid coupling within said housing including a part carried by and rotatable with said spindle and a non-rotatable part, a pressure fluid source, and channel means connecting said source for operation of said device including a passageway connecting between said rotatable and non-rotatable coupling parts and extended through said bearing.

5. In a machine tool the combination of a hollow housing, a rotatable spindle having a portion extended within said housing and an end exposed outside the housing, a bearing for said spindle carried by a wall of said housing and axially between said extended portion and exposed end, a fluid operable device carried by said exposed spindle end, a pressure fluid source, a coupling within said housing including a part carried by and rotatable with said spindle and a non-rotatable part comprising two portions fixed together for mutual abutment along surfaces substantially coinciding with the axis of said rotatable part, and channel means connecting said source for operation of said device including a passageway connecting between said rotatable and non-rotatable coupling parts and extended through said bearing.

6. In a machine tool the combination of a hollow housing, a rotatable spindle having a portion extended within said housing and an end exposed outside the housing, a bearing for said spindle carried by a wall of said housing and axially between said extended portion and exposed end, a fluid operable device carried by said exposed spindle end, a pressure fluid source, a coupling within said housing including a part carried by and rotatable with said spindle and a non-rotatable part, a reverser valve within said housing, and channel means connecting said source for operation of said device including said reverser valve and a passageway connecting between said rotatable and non-rotatable coupling parts and extended through said bearing.

7. In a machine tool the combination of a hollow housing, a rotatable spindle having a portion extended within said housing and an end exposed outside the housing, a bearing for said spindle carried by a wall of said housing and axially between said extended portion and exposed end, a fluid operable device carried by said exposed spindle end, a pressure fluid source, a coupling within said housing including a part carried by and rotatable with said spindle and a non-rotatable part, a reverser valve within said housing, channel means connecting said source for operation of said device including said reverser valve and a passageway connecting between said rotatable and non-rotatable coupling parts and extended through said bearing, and shifter means for operation of said reverser valve including a motion transmitting connection extended through a wall of said housing.

8. In a machine tool the combination of a rotatable spindle, transmission gearing associated with said spindle, a hollow housing enclosing said gearing, a spindle bearing carried by a wall of said housing, said spindle extending through said bearing and having an end exposed outside the housing, a hydraulically operable device carried by the exposed spindle end for rotation with said spindle, a plurality of supply passages associated with said spindle and each extended through said bearing, said passages connecting with said device respectively for operation thereof in opposite directions, a pressure liquid coupling within said housing including a part rotatable with said spindle and a non-rotatable part, a reverser valve within said housing, a pressure liquid source including a reservoir, and a plurality of channels respectively connecting said reverser valve through said coupling with different of said supply passages, said reverser valve being alternatively adjustable to connect said pressure liquid source with different of said channels while simultaneously connecting the other channel for return of liquid to said reservoir.

9. In a pressure fluid coupling the combination of a rotatable and a non-rotatable part, pressure fluid channels respectively in different of said parts, said rotatable part providing a plurality of annular axially spaced co-axial grooves, said non-rotatable part providing a recess outside said grooves for receiving melted metal to form ring portions co-operative with said grooves, and a passageway connecting between said channels at a point axially between the end grooves of said plurality of grooves, said passageway including a member fixed with said non-rotatable part to form a leak-proof joint with the metal in said recess.

10. In a machine tool the combination of a rotatable member, a hydraulically operable device rotatable with said member, said member providing a plurality of axially spaced groups of annular grooves each co-axial therewith, a non-rotatable member encircling said rotatable member and providing a plurality of axially spaced groups of annular ring portions complementary to and closely axially fitted within said grooves, a source of hydraulic pressure liquid, said rotatable member providing a channel extended axially of the member and connected for operation of said device and said non-rotatable member providing a channel communicating with said pressure source, and a closed passageway at a point axially between said groups of grooves and rings and communicating between said channels.

LOUIS EDWARD GODFRIAUX.